May 28, 1963 P. P. NEWCOMB ETAL 3,091,082
COMBINATION TURBOJET AND RAMJET ENGINE
Filed June 22, 1961 3 Sheets-Sheet 1
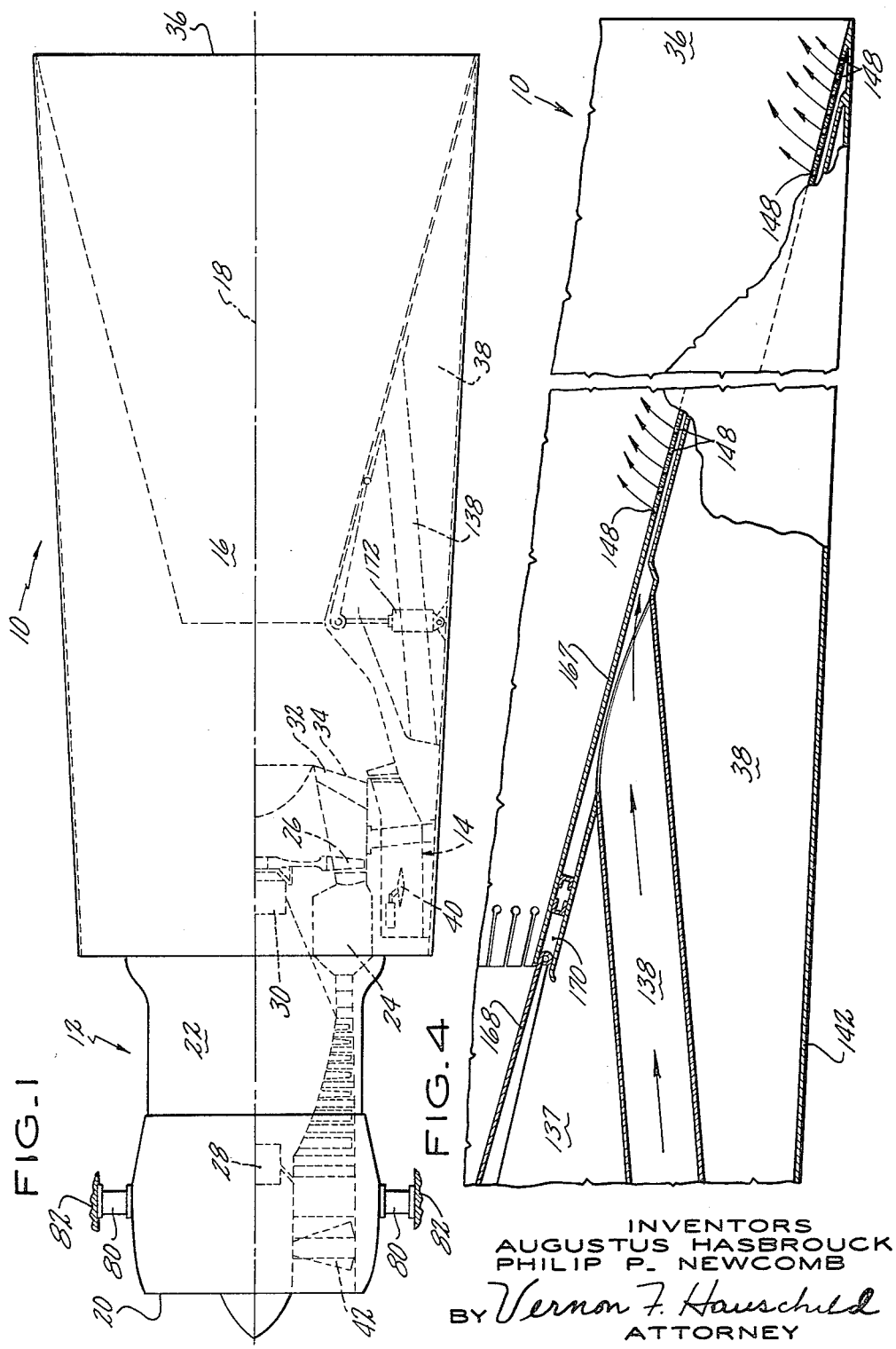
INVENTORS
AUGUSTUS HASBROUCK
PHILIP P. NEWCOMB
BY Vernon F. Hauschild
ATTORNEY May 28, 1963 P. P. NEWCOMB ETAL 3,091,082
COMBINATION TURBOJET AND RAMJET ENGINE
Filed June 22, 1961 3 Sheets-Sheet 2
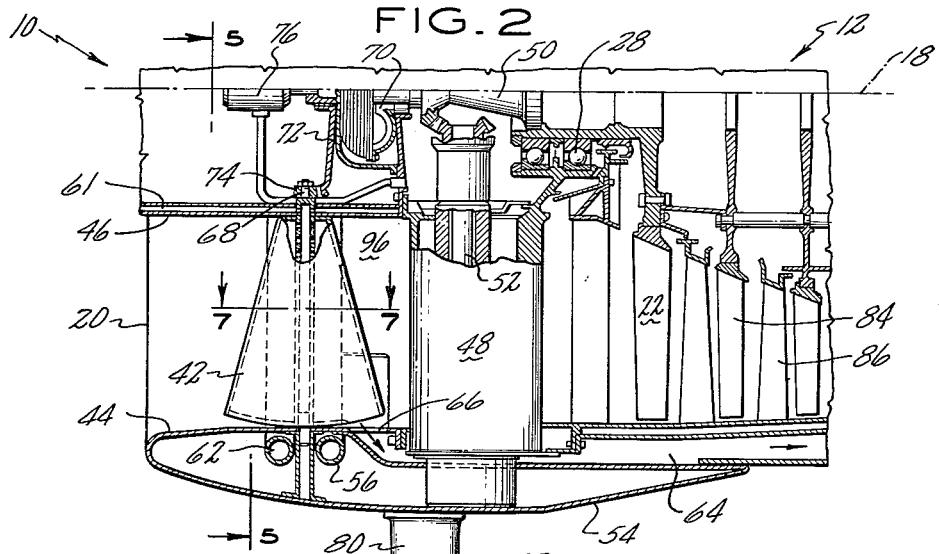
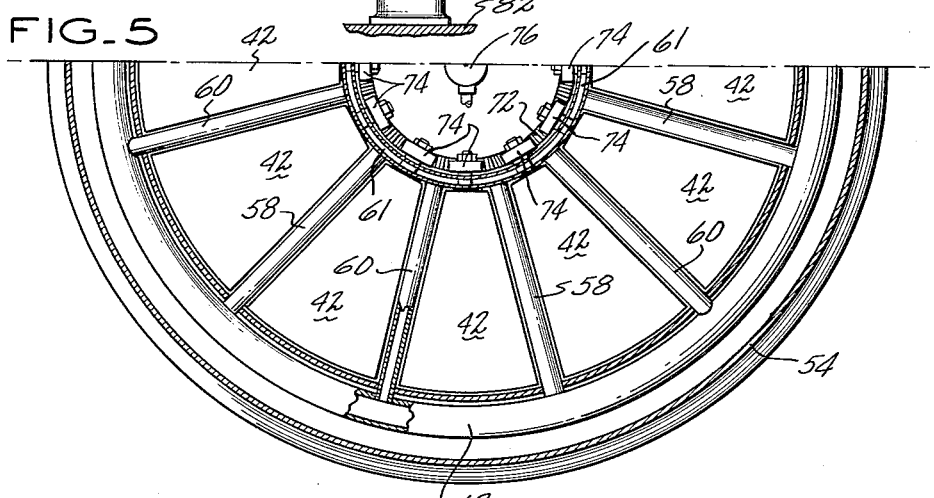
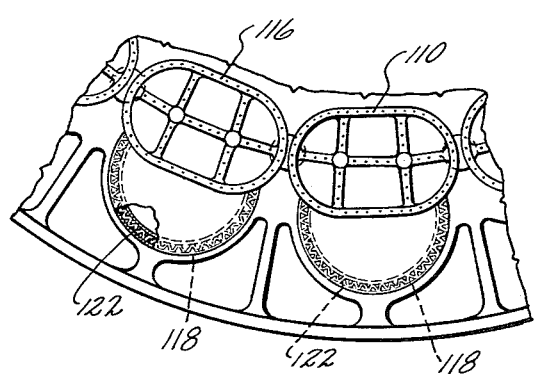
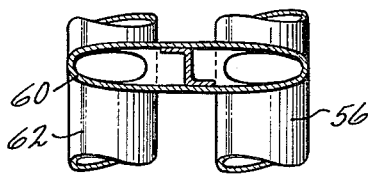
INVENTORS
AUGUSTUS HASBROUCK
PHILIP P. NEWCOMB
BY Vernon F. Hauschild
ATTORNEY

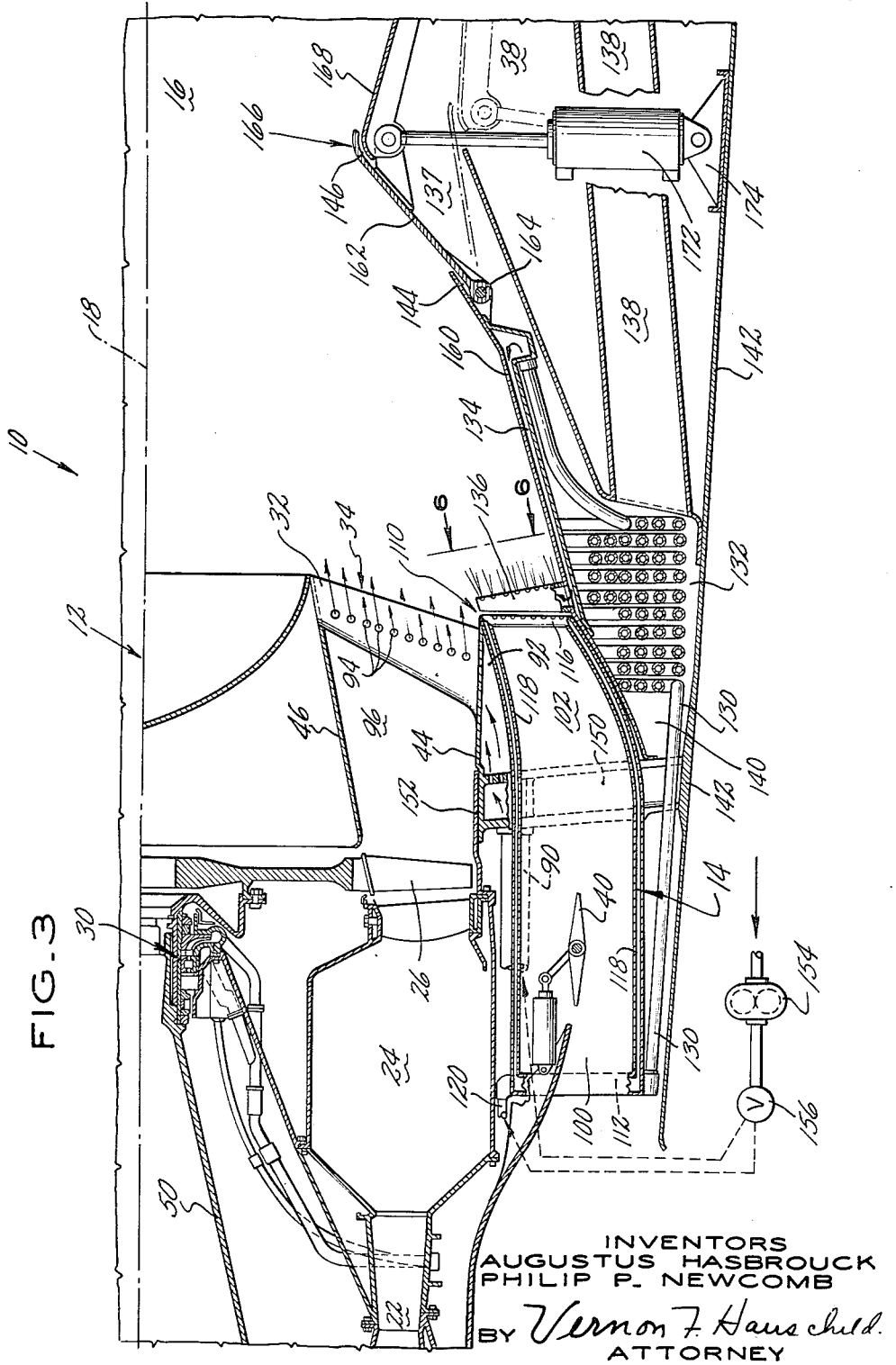

United States Patent Office 3,091,082
Patented May 28, 1963

3,091,082
COMBINATION TURBOJET AND RAMJET ENGINE
Philip P. Newcomb, Manchester, and Augustus Hasbrouck, Middletown, Conn., assignors to United Aircraft Corporation, East Hartford, Conn., a corporation of Delaware
Filed June 22, 1961, Ser. No. 118,830
3 Claims. (Cl. 60—35.6)

This invention relates to aircraft engines and more particularly to a ramjet bypass engine, which is a combination turbojet engine and ramjet engine.

It is an object of this invention to teach an engine which can operate as a turbojet engine at low flight speeds and as a ramjet engine at high flight speeds.

It is a further object of this invention to teach such an engine wherein said turbojet engine operation can be blocked off during periods of ramjet engine operation and vice versa.

It is a further object of this invention to teach such an engine wherein cooling is provided at the turbojet engine inlet and wherein regenerative fuel cooling is provided at the ramjet engine inlet and with provisions for exhaust nozzle cooling.

It is a further object of this invention to teach such an engine wherein a plurality of ramjet engines encircle a turbojet engine.

It is still a further object of this invention to teach such an engine wherein said turbojet engine may be easily disassembled from said ramjet engine.

It is still a further object of this invention to teach such an engine wherein both said turbojet engine and said ramjet engine utilize a common afterburner chamber.

Other objects and advantages will be apparent from the specification and claims, and from the accompanying drawings which illustrate an embodiment of the invention.

FIG. 1 is an external view of our engine partially broken away to illustrate generally the relative position of the turbojet and ramjet portions.

FIG. 2 is an enlarged partial cross-section showing of the inlet of the turbojet section of our powerplant.

FIG. 3 is an enlarged cross-sectional showing of the portion of an engine which illustrates the ramjet inlet section and the forward portion of the exhaust nozzle.

FIG. 4 is an enlarged partial cross-section showing of the downstream or after portion of the exhaust nozzle.

FIG. 5 is a view taken along line 5—5 of FIG. 2 and being partially broken away to illustrate the cooling features and the flap actuation mechanism.

FIG. 6 is a view taken along line 6—6 of FIG. 3.

FIG. 7 is an enlarged cross section view taken along line 7—7 of FIG. 2.

FIGURE 1 shows bypass ramjet engine or combination turbojet and ramjet engine 10 which basically comprises a turbojet engine 12 surrounded by one or more ramjet engines 14, each of which are in communication with afterburner chamber 16. Powerplant 10 is of generally circular cross-section and concentric about axis 18.

Turbojet engine section 12 comprises inlet section 20, which may be of innumerable varieties and shapes but which performs the general function of conducting atmospheric air to compressor section 22. The air which enters inlet 20 is compressed in compressor section 22 and then has heat added thereto in passing through burners 24, from whence it passes through turbine section 26. Sufficient energy is extracted from the engine gases by turbine 26 to drive turbine 26 and compressor 22, which are mounted on rotatable shafts supported by bearing units 28 and 30. After passing through turbine 26, the turbojet engine exhaust gas, has fuel added thereto by a plurality of fuel spray bars 32 which are perforated and extend across the outlet 34 of turbojet engine 12. The resultant air-fuel mixture enters afterburner chamber 16 and is burned and discharged to atmosphere through outlet 36.

Still viewing FIG. 1, ramjet engine section 14 encircles or enshrouds turbojet engine 12 and communicates with afterburner chamber 16. Variable area, convergent-divergent exhaust nozzle 38 is attached to the after or downstream end of the ramjet inlet section 14 and defines afterburner chamber 16 downstream of both turbojet engine 12 and ramjet inlet section 14.

The brief description just given of the operation and construction of turbojet engine 12 is believed to be sufficient for the present purpose since the construction is well known and fully described in U.S. Patent Numbers 2,711,631 and 2,747,367, to which reference is hereby made.

As will be more fully described hereinafter, during periods of low flight speed operation, valve means 40 may be actuated to block flow through ramjet section 14, while flaps 42 are open to permit air flow through turbojet engine 12. Conversely, during periods of high speed operation (Mach 6, for example), flaps 42 may be actuated to block or prevent flow through turbojet engine 12 while valves 40 are open to permit ramjet operation.

Referring to FIG. 2, we see the portion of turbojet engine 12 adjacent inlet 20. Inlet 20 constitutes the beginning of an annular gas passage 96 defined between outer wall 44 and inner wall 46 and terminates at outlet 34. Inlet 20 serves to conduct atmospheric air to compressor 22. Inlet guide vanes 48 extend radially between inner and outer walls 44 and 46 and are circumferentially positioned thereabout to serve as structural members serving to position outer and inner walls 44 and 46 with respect to compressor shaft 50, which is supported at its forward end by bearing unit 28. Compressor shaft 50 may well be geared to an accessory drive shaft 52 which extends thru one or more of the inlet guide vanes 48 to drive any desired engine accessory such as the fuel pump.

Annular jacket 54 encircles engine inlet section 20 and contains a coolant such as water which may be pumped by any pumping means (not shown) through inlet manifold ring 56, which is also shown in FIG. 5, thence radially inwardly through hollow struts 58 into central ring manifold 61 from whence it passes radially outwardly through struts 60 into scavenge ring manifold 62 for cooling. A portion of the coolant is conducted from inner manifold 60 into the interior of porous flaps 42 for transformation into steam therein and then passage through compressor 22. Annular jacket 54 cooperates with inner wall 44 to define an annular cooling air passage 64 into which air enters through a plurality of apertures 66 and is passed rearwardly to cool the engine mounted accessories and other engine components.

During periods of ramjet operation, it is important to prevent aerodynamic losses by preventing the flow of air through turbojet engine 12. This is accomplished by placing flaps 42 between the aforementioned struts 58 and 60. Flaps 42 extend between outer and inner walls 44 and 46 and are pivotable about radially extending pins 68 or comparable members, which are secured for rotation in walls 44 and 46. Flaps 42 are defined to be aerodynamically unbalanced such that the passage of ram air thereover will keep them in the open position such that an actuating force will be required to close them. Referring to FIGS. 2 and 5, there will be noted that the flap closing actuating force is supplied by hydraulic clutch 70 which is connected to ring gear 72, which is in turn connected to pinion gears 74 at the inner end of each flap 42. Hydraulic fluid is caused to enter hydraulic clutch 70 by pilot actuated motor 76 to cause the rotation of gears 72 and 74 and hence the closing of flaps 42 which cooperate with struts 58 and 60 to completely block off inlet 20 of turbojet engine 12.

Still referring to FIG. 2, we see that the forward end of powerplant 10 is supported by two or more engine mounts 80 which are readily disassembleable and supported in turn by any accessible support structure, such as nacelle 82. Mounts 80 may be of the type taught in U.S. Patent No. 2,936,978. We further see that compressor 22 comprises alternate rotors 84 and stators 86 which act upon the air in passage 96 to compress it.

Referring to FIG. 3, we see the downstream end of our turbojet engine 12 which includes the after end of compressor 22, burners 24 and turbine 26, which is supported from shaft 50 through bearing unit 30. At turbojet engine outlet 34 it will be noted that a plurality of radially extending and circumferentially positioned hollow struts or spray bars 32 extend between outer wall 44 and inner wall 46 to serve in part as support members therebetween and also to receive fuel from fuel line 90, through fuel annulus 92, into the interior of struts 32 for discharge through apertures 34 into annular gas passage 96 so as to create a fuel-air mixture with the engine exhaust gases passing therethrough for discharge into afterburner chamber 16.

Ramjet inlet section 14 encircles the downstream end of turbojet engine 12 and has an open inlet 100 and one or more cavities 102 in communication with inlet 100 and afterburner chamber 16 to permit the flow of ambient air through cavity 102 into after burner chamber 16. Ramjet inlet 14 preferably consists of a plurality of circumferentially positioned and axially extended chambers 102 which, as has been shown in FIG. 6, are circular in their forward end 100 and oval shapel in their after end 110. The area of the after ends 110 is less than the forward ends 100 so that the cavities 102 form convergent passages areawise and also converge toward axis 18. Each cavity 102 is defined by hollow walls 118 such that a ring shaped fuel manifold 112 is formed at forward end 100 and an oval shaped and perforated fuel dispensing member 116 is formed at after end 110. Elements 112 and 116 are joined by hollow walls 118 such that the fuel which enters fuel manifold 112 through line 120 passes through hollow walls 118 which may be of tubular construction or may have corrugated fuel passage defining spacers 122 (FIG. 6) therein, to serve to regeneratively cool walls 118 and eventually the fuel so provided enters fuel dispersing elements 116 for discharge into afterburner chamber 16 as a fuel-air mixture formed with the atmospheric air passing through chamber 102.

Still referring to FIG. 3, the fuel which enters fuel annulus 112 also passes through fuel tube 130, which fuel tube forms a plurality of engine encircling rings such as 132 forming a heat exchanger about inlet section 114 and eventually entering annular chamber 134 and then entering a plurality of perforated fuel spray bars 136 which are positioned circumferentially about afterburner chamber 16 and immediately downstream of fuel dispensing elements 116. Cooling air enters annular chamber 140 formed between ramjet inlet section 14 and outer wall 142, passing over fuel tube heat exchanger 132 and thence through passages 137 and 138 from whence it is discharged through aperture 144, 146 and the plurality of apertures 148 (FIG. 4) to cool the gas passage defining walls of exhaust nozzle 38.

Again referring to FIG. 3, it will be noted that a plurality of substantially radially extending struts 150 extend from outer case 142 to inner case 44 and engage inner case 44 in a slip fit along line 152. Accordingly, with the forward engine mounts 80 disconnected and fuel lines 120 and 90 disconnected, turbojet engine 12 may be slid axially forward and free of ramjet engine 14 and afterburner section 16.

It will be obvious to those skilled in the art that fuel may be provided to fuel lines 120 and 90 by any means such as pump 154 which is connected thereto through valve 156 which valve may be pilot operated and constructed such that it will immediately switch fuel flow from one or the other of lines 90 and 120 to the other or such that the transfer takes place gradually instead of immediately to insure that when transcending from low flight speed to high flight speed operation, turbojet engine 12 remains operative until ramjet engine 14 is fully operative.

Referring to FIGS. 3 and 4, it will be noted the variable area convergent-divergent nozzle 38 is attached to and extends rearwardly from ramjet inlet section 14 to define afterburner chamber 16. Referring to FIG. 3, we see that the convergent portion of exhaust nozzle 38 includes a stationary duct 160, which is of frusto-conical shape and also includes pivotal flaps 162 each of which is pivotal about a pin or axis 164 and which are spaced circumferentially about axis 18 to define a variable area duct culminating at its after end in defining the exhaust nozzle throat 166.

The divergent portion of the exhaust nozzle comprises a fixed portion or wall 167 and movable flap elements 168 which are pivotably and slideably received in annular cavity 170 (FIG. 4) at their after ends and which are linked to and actuated with flaps 162 at their forward ends. Actuating cylinder piston units 172 are pivotably connected to flaps 162 and 168 and are also pivotably connected to outer wall 142 through bracket 174. Exhaust nozzle 38 is shown in its low speed flight condition in solid lines in FIG. 3 and in its high speed in phantom in FIG. 3 so that exhaust nozzle 38 is a variable area and defines a convergent-divergent exhaust nozzle at all times.

It is to be understood that the invention is not limited to the specific embodiment herein illustrated and described but may be used in other ways without departure from its spirit as defined by the following claims.

We claim:

1. A powerplant of generally circular cross section and concentric about an axis and having a forward upstream end and an after downstream end and comprising a turbojet engine having a compressor, burner and turbine in forward-end to after-end axial alignment, an afterburner attached to the downstream end of said turbojet engine, a variable area convergent-divergent exhaust nozzle attached to and forming an outlet for said afterburner, air intake means surrounding said engine and including a forwardly directed inlet opening joined to conduit means communicating with said afterburner, means to block flow thru said inlet means such that said powerplant can be operated as a turbojet engine at low flight speeds, means to block flow thru said turbojet engine such that said powerplant can be operated as a ramjet engine at high flight speeds, means to supply fuel to said afterburner during both turbojet engine and ramjet operations, heat exchanger means forming part of said fuel supply means including ducting supplying cooling air to said exhaust nozzle, said convergent-divergent exhaust nozzle comprising a convergent stationary duct at its forward-end and a divergent stationary duct in axially spaced relation to said convergent duct at its after-end, said divergent duct having spaced walls forming an annular cavity at its forward-end and including apertures in the inner of said walls at its after-end, a first plurality of circumferentially positioned flaps pivotally attached to the after-end of said convergent duct, a second plurality of circumferentially positioned flaps pivotally attached at their forward-ends to the after-end of the flaps of said first plurality and slideably received in said divergent duct annular cavity at their after-ends, actuating means connected to said flaps of said first and second flap pluralities to cause said flaps to pivot in unison to form a variable area throat for said exhaust nozzle, and said cooling air ducting positioned and contoured to guide cooling air over at least one surface of each of said flaps and between the walls of said divergent duct for passage therefrom through said apertures into the interior of said divergent duct.

2. A combination ramjet and turbojet engine of generally circular cross section including a turbojet engine, a ramjet inlet encircling said turobjet engine conduit means attached to said ramjet inlet and forming an afterburner chamber downstream of said turbojet engine and said ramjet inlet, a variable area convergent-divergent exhaust nozzle attached to the downstream end of said conduit means, a plurality of fuel spray bars located in said turbojet engine and positioned to inject fuel into said afterburner chamber, said ramjet inlet comprising a plurality of separate axially extending chamber forming walls circumferentially positioned about said turbojet engine and said walls being of circular cross section at their upstream end and further being of smaller area and having oval cross-section and perforations at their downstream end, said walls being shaped to form a fuel manifold at said circular upstream end and having at least one hollow cooling passage connecting said manifold and said perforations so that fuel entering said manifold will flow through said passage to cool said walls before passing through said perforations into said afterburner chamber, a heat exchanger encircling said ramjet and comprising fuel tubes attached to said fuel manifold, cooling air ducting enshrouding said fuel tubes and extending to said exhaust nozzle to direct cooling air thereto, additional fuel spray bars positioned downstream of said oval ends and connected to receive fuel from said fuel tubes, means to block flow thru said ramjet inlet such that said combination engine can be operated as a turbojet engine at low flight speeds, and means to block flow thru said turbojet engine such that said combination engine can be operated as a ramjet at high flight speeds.

3. A combination ramjet and turobjet engine of generally circular cross section including a turbojet engine, having an inlet and an outlet, ramjet inlet means encircling said turbojet engine outlet, conduit means attached to said ramjet inlet and forming an afterburner chamber downstream of said turbojet engine and said ramjet inlet, a variable area convergent-divergent exhaust nozzle attached to the downstream end of said conduit means, a plurality of fuel spray bars located in said turbojet engine and positioned to inject fuel into said afterburner chamber, said ramjet inlet comprising a plurality of separate axially extending chamber forming walls circumferentially positioned about said turbojet engine and said walls being of circular cross section at their upstream end and further being of smaller area and having oval cross-section and perforations at their downstream end, said walls being shaped to form a fuel manifold at said circular upstream end and having at least one hollow cooling passage connecting said manifold and said perforations so that fuel entering said manifold will flow through said passage to cool said walls before passing through said perforations into said afterburner chamber, a heat exchanger encircling said ramjet inlet and comprising fuel tubes attached to said fuel manifold, cooling air ducting enshrouding said fuel tubes and extending to said exhaust nozzle to direct cooling air thereto, additional fuel spray bars positioned downstream of said oval ends and connected to receive fuel from said fuel tubes, means to block flow thru said ramjet inlet such that said combination engine can be operated as a turbojet engine at low flight speeds, means including a plurality of circumferentially positioned porous flaps each pivotable about a radially extending pin and actuatable to block flow thru said turbojet engine such that said combination engine can be operated by ramjet at high flight speeds, and cooling means comprising a water jacket enshrouding said turbojet engine inlet and including means to pass ducted coolant across said inlet and into said porous flaps for transition into steam and then entry into said turbojet engine.

References Cited in the file of this patent
UNITED STATES PATENTS

| | | |
|---|---|---|
| 2,504,421 | Johnson | Apr. 18, 1950 |
| 2,586,025 | Godfrey | Feb. 19, 1952 |
| 2,672,333 | Rocheville | Mar. 16, 1954 |
| 2,716,329 | Lunger | Aug. 30, 1955 |
| 2,733,350 | Barrett et al. | Dec. 11, 1956 |
| 2,800,765 | French et al. | July 30, 1957 |
| 2,867,978 | Peterson | Jan. 13, 1959 |
| 2,896,408 | O'Donnell | July 28, 1959 |
| 2,933,886 | Sharma | Apr. 26, 1960 |
| 2,934,895 | Gregory et al. | May 3, 1960 |